Dec. 7, 1937.   J. MERCIER   2,101,265
SHOCK ABSORBER
Filed Dec. 26, 1934   2 Sheets-Sheet 1

Fig.2ª

Jean Mercier
INVENTOR
By Ottomunk
his ATT'Y.

Dec. 7, 1937.    J. MERCIER    2,101,265
SHOCK ABSORBER
Filed Dec. 26, 1934    2 Sheets-Sheet 2

Jean Mercier
INVENTOR
his ATTY.

Patented Dec. 7, 1937

2,101,265

UNITED STATES PATENT OFFICE 2,101,265

SHOCK ABSORBER

Jean Mercier, Neuilly-sur-Seine, France

Application December 26, 1934, Serial No. 759,204
In France January 9, 1934

10 Claims. (Cl. 267—64)

The present invention relates to landing gears for aeroplanes and other shock-absorbers containing fluid, of the type in which a deformable chamber communicates with an auxiliary chamber through one or more conduits which may be closed by valve devices. The principal object of the invention consists in closing off the connection between the deformable chamber and the auxiliary chamber when the violence of the shock to be absorbed causes, starting from the idle position, an exaggerated relative displacement of the opposite walls of the deformable chamber, then opening the connection when the movement changes in direction, thus diminishing the reaction, by allowing the excessive pressure of fluid thus produced, to diminish by its expansion into the said auxiliary chamber.

The shock-absorbers according to the invention may be completed by a safety-valve which connects the deformable chamber with the auxiliary chamber when the pressure reaches a dangerous degree which might occasion mechanical breakage. This affords a shock-absorber which is adapted to absorb, during a very considerable part of its stroke, the maximum energy compatible with the mechanical resistance in question.

The invention is particularly applicable to landing devices for airplanes, to the buffers of locomotives, to artillery brakes, to automobile spring systems, etc.

The accompanying drawings represent, by way of example, various forms of execution of the object of the invention.

Figs. 1 to 6 represent, in longitudinal section, each of the six forms of execution which will be further described.

Figure 1:
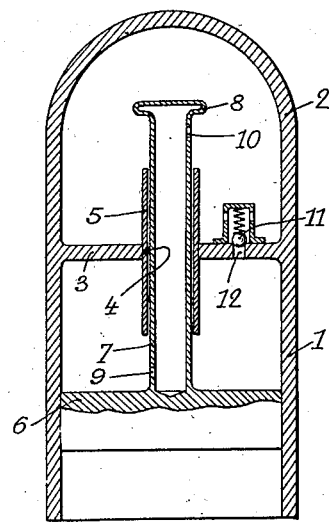

In the form of execution shown in Fig. 1, a cylinder 1 is separated from an auxiliary chamber 2 by a partition 3 pierced with an aperture 4 in which is slidable, by hard friction, a tube 5. A piston 6, adapted to slide in the cylinder 1, is provided with a hollow rod 7 which is slidable by easy friction in the tube 5 and comprises at the upper end a flanged part 8. Near the respective ends of the hollow rod 7 are formed orifices 9 and 10 adapted to connect the cylinder 1 with the auxiliary chamber 2. When, under the action of a shock, the piston 6 and the partition 3 approach one another, the fluid first passes freely from the cylinder 1 into the chamber 2 through the orifice 9, the tube 7 and the orifice 10, but when the amount of the relative displacement between the partition 3 and the piston 6 reaches a stated value, the orifice 9 is closed by the tube 5, and thus the fluid can no longer pass from the cylinder into the auxiliary chamber. The fluid is thus compressed in the cylinder 1, offering an increasing resistance to the approaching movement between the piston 6 and the partition 3. During this movement, the piston 6 makes contact with the tube 5 and thus causes it to move. A safety-valve 11, which closes an aperture 12 in the partition 3, provided for the passage of the fluid from the cylinder 1 into the chamber 2, in case the pressure in the cylinder 1 should reach an excessive value such as would cause mechanical breakage.

When the device begins to return to the idle position, the orifice 9 is uncovered, and again makes connection between the cylinder 1 and the chamber 2, thus preventing a too abrupt separation of the piston 6 and the partition 3, and hence reducing the rebounding action.

Inversely, when the shock has the effect of separating the piston 6 from the partition 3, the fluid first passes freely from the chamber 2 into the cylinder 1; after a certain relative displacement between said piston and partition, the orifice 10 is covered by the tube 5, and thus a vacuum of increasing value is produced in the cylinder 1, which acts against the separation of the piston 6. During this separation, the flanged part 8 makes contact with the tube 5 and thus causes it to move. When the device begins to return to the idle position, the orifice 10 is uncovered and again makes connection between the cylinder 1 and the chamber 2, thus reducing the rebounding action.

It is evidently possible to regulate the length of the tube 5 and the distances between the respective orifices 9 and 10, and the piston 6 and flange 8, in order to obtain different damping effects.

Figure 2:
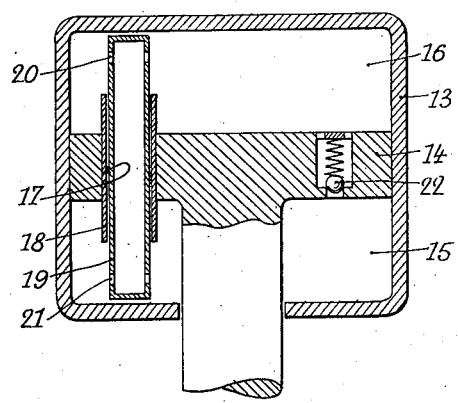
Figure 2:
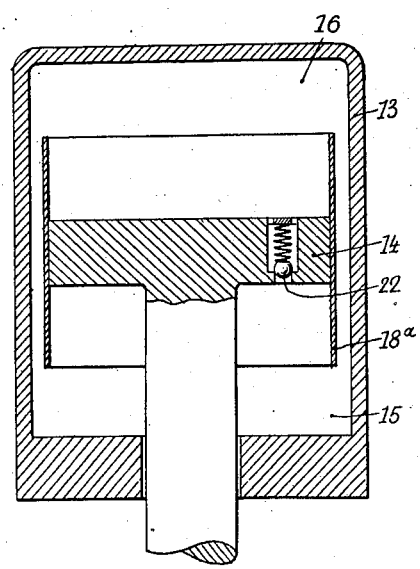

In the example of execution shown in Fig. 2, a cylinder 13 has slidable therein a piston 14 which divides the cylinder into two chambers, whereof one forms the deformable space 15 and the other the auxiliary chamber 16. In an aperture 17 in the piston 14 is slidable, by hard friction, a tube 18, which is itself traversed, by easy friction, by a tube 19 pierced at its ends with respective orifices 20 and 21. The tube 19 may extend as far as the adjacent walls of the cylinder 13, when in the idle position; it may also, when in this position, leave a certain clearance with reference to these adjacent walls, as shown in the figure. A safety-valve 22 provides a connection between the chamber 15 and the chamber 16 in the case of an excessive pressure in the chamber 15. The operation of this device is quite similar to what prevails for Fig. 1. This device is particularly advantageous for airplane landing gear.

The device shown in Fig. 2a differs from the one shown in Fig. 2, by the fact that the hard-friction tube 18a surrounds the piston 14, the tube 19 being eliminated. The operation is the same as in the case of Fig. 2.

Figure 3:
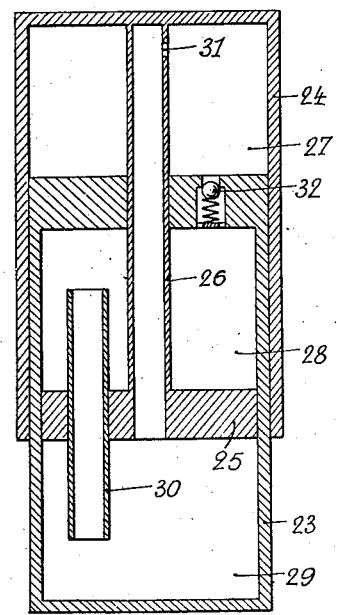

In the example of execution shown in Fig. 3, a cylinder 23, closed at both ends, is slidable in a cylinder 24 which is connected with a piston 25 slidable in the cylinder 23, by means of a hollow rod 26, thus forming three chambers of variable volume 27, 28 and 29. A tube 30 is adapted to slide by hard friction in an aperture formed in the piston 25. An orifice 31 in the hollow rod 26 serves to make a permanent connection between the end chambers 27 and 29.

When a shock has the effect of driving the cylinder 23 into the cylinder 24, the chambers 27 and 29 will diminish in volume, whilst the chamber 28 increases in volume. The fluid thus passes from the chambers 27 and 29 into the chamber 28 through the orifice 31, the tube 26 and the tube 30. When the amount of the relative displacement between the two cylinders 23 and 24 reaches a stated value, the lower wall of the cylinder 23 closes the lower end of the tube 30, thus preventing all communication with the chamber 28. The fluid will thus be compressed in the two chambers 27 and 29, so that each of the two end walls of the cylinder 23 will operate on its own account, hence doubling the energy absorbed for a given amount of motion. As the cylinder 23 continues to enter the cylinder 24, the lower wall of this cylinder 23 will carry with it the tube 30, and thus when the device returns to the idle position, the lower end of the tube 30 is at once uncovered and makes connection with the chamber 28.

A similar action takes place when the initial shock has the effect of withdrawing the cylinder 23 from the cylinder 24 while compressing the fluid in the chamber 28, until the upper wall of the cylinder 23 makes contact with the tube 30 while drawing with it this tube 30.

In this case as well, it is possible to regulate the length of the tube 30 in order to obtain different effects of damping. A safety-valve 32 serves the same purpose as the safety-valves 11 and 22 of the preceding examples.

Figure 4:
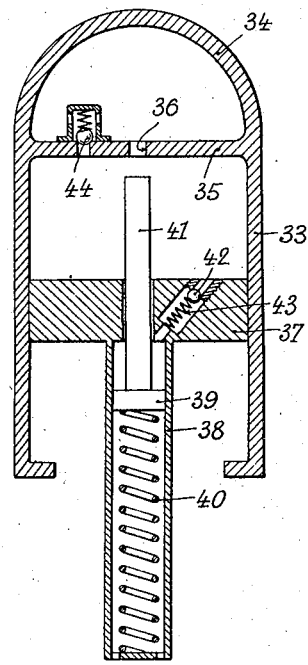

In the example of execution shown in Fig. 4, a partition 35, pierced with an orifice 36, separates a cylinder 33 from an auxiliary chamber 34. A piston 37, slidable in the cylinder 33, carries a tube 38 in which is slidable an auxiliary piston 39, urged by a spring 40 towards the orifice 36, so that the closing member 41 attached to the piston 39 may close this orifice 36. In the piston 37 is provided a valve 42 which is urged by a spring 43 and allows the fluid compressed in the cylinder 33 to pass into the tube 38. A safety-valve 44 serves the same purpose as the safety-valves 11, 22 and 32 in the preceding examples.

When, owing to a shock, the partition 35 approaches the piston 37, the closing member 41 closes the orifice 36, and after this time the fluid is compressed in the cylinder 33, thus damping the relative displacement of the partition 35 and the piston 37. The fluid compressed in the cylinder 33 raises the valve 42 and enters the tube 38 above the auxiliary piston 39. During the return movement towards the idle position, the partition 35 is separated from the piston 37, and the auxiliary piston 39 is moved by this piston, together with the closing member 41, due to the presence of compressed fluid in the tube 38, this fluid being stopped by the valve 42. It will result that when the return movement commences, the orifice 36 will be opened, thus making connection between the cylinder 33 and the auxiliary chamber 34. It will be thus observed that the valve 42 prevents the closing member 41 from rising rapidly due to the pressure of the spring 40 during the return movement. The damping effect can also be regulated by the distance allowed between the closing member 41 and the orifice 36, in the idle position. The compressed fluid above the piston 39 may return slowly into the cylinder 33 due to the slight clearance between the member 41 and the piston 37.

Figure 5:
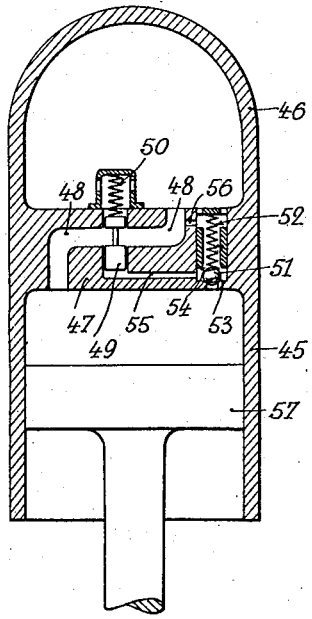

In the preceding forms of execution, the closing member is controlled directly by one of the opposite walls of the deformable chamber, it being secured to this wall. However, the closing member may also be operated without being directly controlled by the opposite walls of the deformable chamber. The example of execution, Fig. 5, shows a device in which the closing member is operated by the pressure produced in the interior of the deformable chamber. A partition 47 separates the cylinder 45 from the auxiliary chamber 46. In this partition is formed a conduit 48 which may be closed by a slide-valve 49 subjected to the pressure of a spring 50. In the idle position, the spring 50 urges the valve 49 into the position shown in Fig. 5, so as to leave the connection free between the cylinder 45 and the chamber 46. A valve 51 is normally urged by a spring 52 against a lower seat 53 formed in the partition 47, but this valve may be driven against the upper seat 54 when the pressure in the cylinder 45 sufficiently exceeds the pressure in the chamber 46. A conduit 55 is employed, when the valve 51 is raised, to circulate the compressed fluid from the cylinder 45 to a point below the valve 49, thus bringing this valve into the conduit 48 and closing the latter. A conduit 56 allows the pressure in the chamber 46 to act upon the valve 51.

When a shock brings the piston 57 near the partition 47, the pressure in the cylinder 45 rises more rapidly than in the chamber 46, owing to the loss of pressure occurring in the conduit 48. When the difference of pressure attains a given value, the valve 51 opens and the fluid compressed in the cylinder 45 is discharged through the conduit 55 and raises the valve 49, thus closing the conduit 48. During the return movement, the valve 51 drops upon its seat 53 under the action of the spring 52, and the slide-valve 49, which is driven back by the spring 50, again makes connection between the cylinder 45 and the chamber 46.

Figure 6:
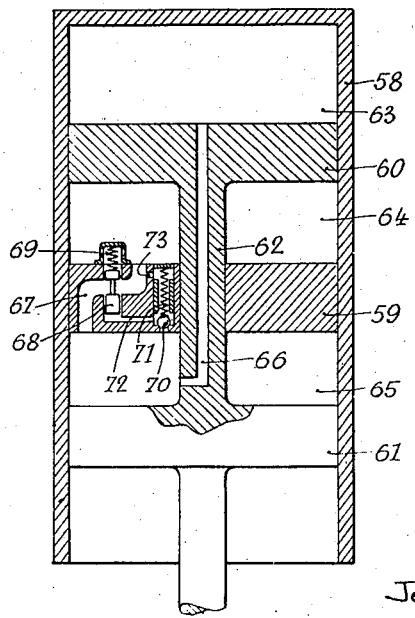

In the example shown in Fig. 6, the cylinder 58 is provided with a partition 59, and on the respective sides of this partition, the pistons 60 and 61, connected together by a rod 62, are slidable in the cylinder 58, forming three chambers of variable volume 63, 64 and 65. A conduit 66 in the rod 62 makes a permanent connection between the end chambers 63 and 65. It is possible, as in the example shown in Fig. 3, to have the partition 59 traversed, by hard friction, by a tube open at the ends, which would be operated alternately by the pistons 60 and 61, and the operation would in this case be the same as for Fig. 3.

In the example represented in Fig. 6, there is provided in the partition 59, in the same manner as for the partition 47 shown in Fig. 5, a conduit 67, a slide-valve 68, a spring 69, a valve 70 urged by a spring 71, and conduits 72 and 73.

When, under the effect of a shock, the pistons 60 and 61 proceed into the cylinder 58, the fluid in the chambers 63 and 65 is compressed and is discharged into the chamber 64 through the conduits 66 and 67. When the difference of pressure between the chambers 63 and 65, and the chamber 64, attains a given value, the valve 70 opens, and the compressed fluid flows through the conduit 72, thus raising the valve 68 in such way as to close the conduit 67. During the return movement, the valve 71 falls upon its lower seat, and the slide-valve 68, urged by the spring 69, again makes connection between the chamber 64 and the chambers 63 and 65. In the same manner as in the example shown in Fig. 3, when the slide-valve 68 is in the closed position, each of the two pistons 60 and 61 acts independently, thus doubling the energy absorbed for a given degree of motion.

It is obvious that the invention is not limited to the examples of execution above described, and may be the subject of numerous modifications without departing from the principle of the invention.

Having now described my invention what I claim as new and desire to secure by Letters Patent is:

1. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination: a container, fluid compressing means provided with two opposite walls operatively connected with said two elements and adapted to be moved towards and away from each other, communicating means between said container and said fluid compressing means, whereby said fluid compressing means is adapted to discharge fluid into said container and to receive fluid from said container when said elements are moved with relation to each other, and intercepting means adapted to close said communicating means after a predetermined relative displacement between said elements from their initial relative position and to again open said communicating means as soon as said elements are returning towards their initial relative position.

2. In a damping device as claimed in claim 1, the further feature consisting in the fact that said intercepting means is carried by one of said walls and is adapted to close said communicating means when the relative displacement between said elements from their initial relative position has brought said intercepting means against the other of said walls and to open said communicating means as soon as said elements are returning towards their initial relative position.

3. In a damping device as claimed in claim 1, the further feature consisting in the fact that said intercepting means comprises an open-ended tube frictionally engaging one of said walls and adapted to close said communicating means when the relative displacement between said elements from their initial relative position has brought said open-ended tube against the other of said walls and to open said communicating means as soon as said elements are returning towards their initial relative position.

4. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination, a cylinder provided with two transversal walls and connected with one of said elements, a piston connected with the other of said elements and adapted to be guided between said walls in said cylinder, whereby two chambers are formed in said cylinder on either side of said piston, communicating means between said two chambers, and an open-ended tube frictionally engaging said piston and adapted to close said communicating means when the relative displacement between said elements from their initial relative position has brought said open-ended tube against one of said walls and to open said communicating means as soon as said elements are returning towards their initial relative position.

5. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination, a cylinder provided with two transversal walls secured on said cylinder and connected with one of said elements, two transversal partitions connected together and with the other of said elements and disposed on either side of one of said transversal walls and adapted to be guided by the inner surface of said cylinder, whereby three chambers are formed between said walls and partitions, a conduit affording a permanent communication between the extreme chambers, communicating means between one extreme chamber and the intermediate chamber, and intercepting means adapted to close said communicating means when the relative displacement between said elements from their initial relative position exceeds a predetermined length and to open said communicating means as soon as said elements are returning towards their initial relative position.

6. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination: a container, fluid compressing means provided with two opposite walls operatively connected with said two elements and adapted to be moved towards and away from each other, communicating means between said container and said fluid compressing means, whereby said fluid compressing means is adapted to discharge fluid into said container and to receive fluid from said container when said elements are moved with relation to each other, intercepting means adapted to close said communicating means after a predetermined relative displacement between said elements from their initial relative position and to again open said communicating means as soon as said elements are returning towards their initial relative position, a conduit between said compressing means and said container and a spring actuated safety valve in said conduit adapted to allow fluid to flow only from said compressing means into said container.

7. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination: fluid compressing means comprising two parts, that is a cylinder connected with one of said elements and a piston connected with the other of said elements and adapted to be guided in said cylinder, a container, communicating means between said container and said fluid compressing means, intercepting means frictionally engaging one of said parts and a stop surface on the other of said parts adapted to cooperate with said intercepting means and to close said communicating means when said elements are displaced from their initial relative position and to again open said communicating means as soon as said elements are returning, towards their initial relative position.

8. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination, a container, fluid compressing means provided with two opposite walls operatively connected with said two elements and adapted to be moved towards and away from each other, communicating means between said container and said fluid compressing means, whereby said fluid compressing means are adapted to discharge fluid into said container and to receive fluid from said container when said elements are moved with relation to each other, intercepting means carried by one of said opposite walls and adapted to close said communicating means when the relative displacement between said elements from their initial relative position exceeds a predetermined length, and stop surfaces on the other of said walls adapted to be engaged by said intercepting means, whereby said intercepting means are brought into the open position as soon as said elements are returned towards their initial relative position.

9. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination, a container, fluid compressing means provided with two opposite walls operatively connected with said two elements and adapted to be moved towards and away from each other, an open-ended tube frictionally engaging one of said walls and extending on either side of said wall, a second tube with closed ends slidingly engaging said open-ended tube and carried by the other of said walls and provided near its ends on its lateral surface with apertures adapted to be covered and uncovered by said open-ended tube, and stop surfaces at the ends of said second tube adapted to be engaged by the ends of said open-ended tube.

10. In a damping device between two elements movable with relation to each other and connected by an elastic connection adapted to maintain said elements in an initial relative position at a predetermined distance from each other when at rest and to bring again said elements at the same distance when they have been moved towards and away from each other, in combination, a container, fluid compressing means provided with two opposite walls operatively connected with said two elements and adapted to be moved towards and away from each other, communicating means between said container and said fluid compressing means, whereby said fluid compressing means are adapted to discharge fluid into said container and to receive fluid from said container when said elements are moved with relation to each other, intercepting means adapted to open and to close said communicating means, guiding means for said intercepting means, yielding means adapted to urge said intercepting means in the open position, a conduit between said compressing means and said guiding means adapted to allow fluid from said compressing means to urge said intercepting means in the closed position, and spring actuated valve means normally inserted in said conduit and adapted to release said conduit when the pressure in said compressing means exceeds a predetermined value.

JEAN MERCIER.